United States Patent [19]

Barnard

[11] Patent Number: 5,012,086
[45] Date of Patent: Apr. 30, 1991

[54] OPTOELECTRONIC PICKUP FOR STRINGED INSTRUMENTS

[76] Inventor: Timothy J. Barnard, 2141 Crystal Lk. Ct. Dr., #0-269, Utica, Mich. 48087

[21] Appl. No.: 416,967

[22] Filed: Oct. 4, 1989

[51] Int. Cl.$^5$ ............................................. G01V 9/04
[52] U.S. Cl. ................... 250/222.1; 250/561; 250/231.10; 250/237 R; 84/724
[58] Field of Search .......... 84/724; 250/211 K, 229, 250/237 R, 211 J, 231.1, 231.11, 231.19, 222.1, 561; 73/651, 653, 655; 356/384, 385, 386, 387, 375, 373

[56] References Cited

U.S. PATENT DOCUMENTS

| | | | |
|---|---|---|---|
| 3,011,379 | 12/1961 | Corwin | 84/724 |
| 3,038,363 | 6/1962 | Miessner | 84/1.14 |
| 3,193,689 | 7/1965 | Kerr | 356/385 |
| 3,441,738 | 4/1969 | Dosch et al. | 356/385 |
| 3,639,769 | 2/1972 | Clark | 250/211 K |
| 3,649,840 | 3/1972 | Thorn et al. | 250/211 K |
| 3,733,953 | 5/1973 | Ferber | 84/1.14 |
| 4,199,254 | 4/1980 | Kobayashi et al. | 356/373 |
| 4,250,378 | 2/1981 | Mutton | 250/211 K |
| 4,429,607 | 2/1984 | Meno | 84/1.18 |
| 4,550,250 | 10/1985 | Mueller et al. | 356/375 |
| 4,563,931 | 1/1986 | Siebeneiker et al. | 84/1.16 |
| 4,649,748 | 3/1987 | Fukano et al. | 73/653 |
| 4,675,517 | 6/1987 | Shiomi | 354/403 |
| 4,688,460 | 8/1987 | McCoy | 84/1.16 |
| 4,730,530 | 3/1988 | Bonanno | 84/1.16 |
| 4,812,635 | 3/1989 | Kaufmann et al. | 250/211 K |
| 4,815,353 | 3/1989 | Christian | 84/1.16 |
| 4,825,069 | 4/1989 | Hutchisson et al. | 250/229 |

Primary Examiner—Davis L. Willis
Assistant Examiner—Michael Messinger

[57] ABSTRACT

An optoelectronic pickup for providing an electrical output signal that is a linear representation of the relative displaced position of a mounted string. A collimated light source enables high contrast shadows of the string to be sensed by a photodetector. It also excludes information about the displaced position of the string in all directions except those along a single axis. The photodetector has a large flat surfaced area providing an output signal throughout the entire normal operating displacement range of the string. The design of the detector system results in a linear relationship between the relative position of the string and the total integrated illumination of the active area of the photodetector and hence the electrical output signal. A dual detector scheme allows the pickup to be immune to stray light and also to noise pickup on the lead wires.

28 Claims, 3 Drawing Sheets

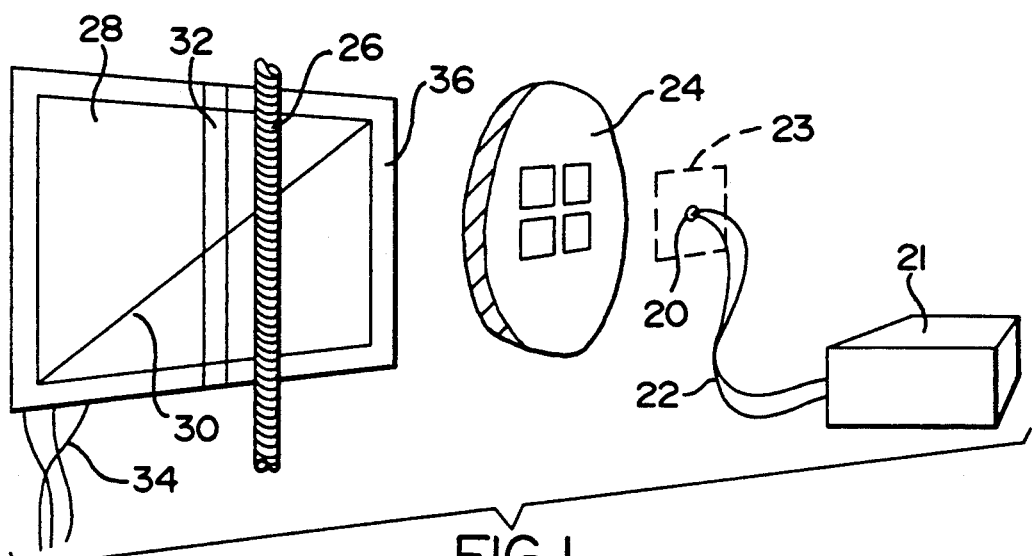
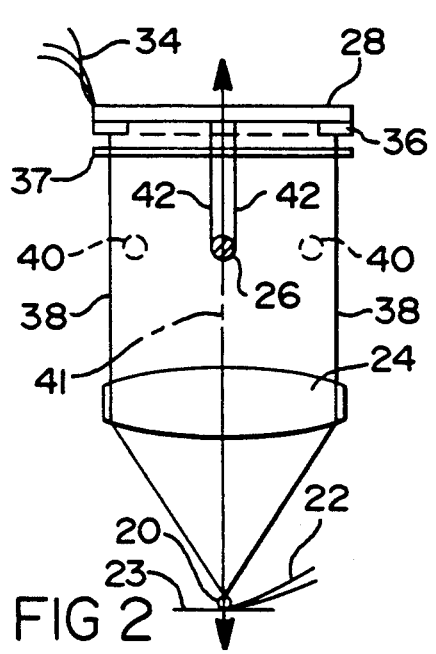
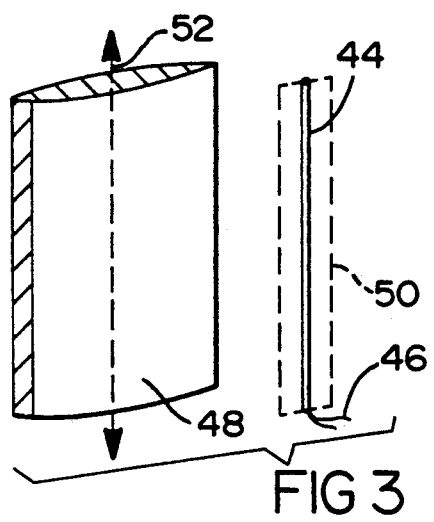
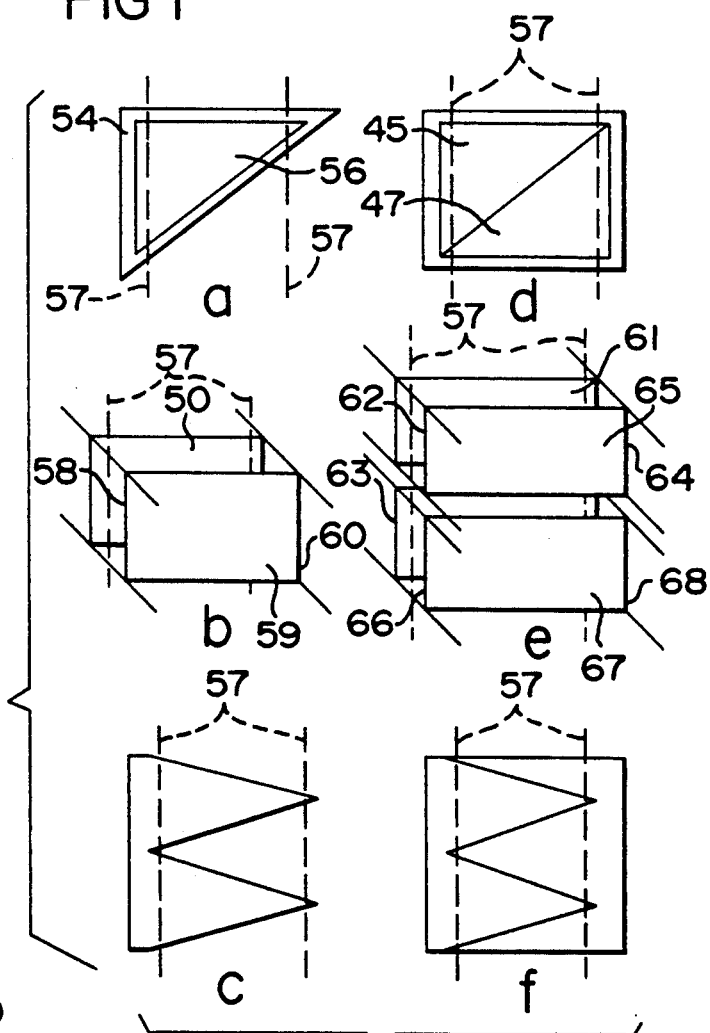
FIG 1
FIG 2
FIG 3
FIG 4

OPTOELECTRONIC PICKUP FOR STRINGED INSTRUMENTS

TECHNICAL FIELD

The present invention relates to pickups for stringed instruments such as the guitar, specifically to an improved version of an optoelectronic pickup.

BACKGROUND OF THE INVENTION

The magnetic pickup has become the standard pickup for the guitar as well as for other stringed instruments. Recently however, there has been some effort to overcome its inherent disadvantages which include a weak signal, sensitivity to stray fluctuating magnetic fields, limited frequency response, and dependency on metal strings.

Optoelectronic pickups have been devised in an attempt to overcome some of these problems. They generally consist of a light emitter-detector combination configured in such a way as to detect the motion of a string as it moves through, and interferes with, the light path between the emitter and the detector.

Although they may generally overcome some of the problems of the magnetic pickup, they exhibit certain inadequacies and even generate problems of their own. For example, none of these new pickups guarantee a linear relationship, or any definitive relationship for that matter, between the actual position or speed of the string and the electrical output signal of the pickup. They also tend to combine the two dimensions of motion of a cross section of a vibrating string into a one dimensional output signal in a vague and often undesirable way.

No well defined continuous relationship between string motion and signal output exists in these systems. For example, many such pickups work simply by relying on the string to chop a beam of light, indicating that the relationship between the string motion and position and output signal is highly nonlinear and noncontinuous.

Intentionally or unintentionally combining the electrical representation of the two dimensions of the string motion in the output signals of these pickups can produce undesirable effects. When they are combined, the portion of the output signal due to string motion along one axis of motion can interfere with the portion of the output signal due to string motion along another axis causing harmonic distortion of the output signal. This is an important consequence since it is expected to have the string moving significantly in two dimensions whenever its vibrating. The belief that the string only vibrates significantly along one axis after it is strummed or plucked is really a misconception. In fact it is actually quite difficult to intentionally make it vibrate in this manner. During normal guitar playing the strings are typically going through a variety of complex and changing paths including elliptical, circular, etc.

A nonlinear relationship between the string position and the output signal also generates harmonic distortion. This is a principal reason that a pickup should have an output signal that is a definitive linear representation of the relative position of the string being observed.

U.S. Pat. No. 3,733,953 issued May 22, 1973 to Ferber discloses an optoelectronic pickup that operates on the principal of a string intersecting the path of a light beam from a light emitting device toward a light-detecting device.

U.S. Pat. No. 4,563,931 issued Jan. 14, 1986 to Siebeneiker discloses a system for scanning the vibrations of a mass. It includes a source of scanning radiation, and the umbra behind the mass and the surrounding illuminated area is collected by a focusing lens and projected onto an optoelectronic converter.

In the ensuing description of the present invention, the axis of a string or the longitudinal axis of a string shall be understood to mean the imaginary line through the center of the stationary string when mounted taught. When referring to a cross section of a string it will be meant the intersection between the string and a two dimensional plane to which the axis of the string is normal. To define a relative string position or a relative position of a string, first consider the center point of a given cross section of a mounted string. Now consider the position of this point relative to a given second point that is also on the same cross sectional plane that contains the string cross section. Assume also that this second point is fixed within the reference frame of the string's mount. The position of the first point relative to the given second point shall be called the relative string position. Typically then, whenever discussing a relative string position it will be understood to be with respect to a given cross sectional plane, and more than likely to be where an optical pickup is to be placed.

As a result of the inability of current optoelectronic pickup systems to isolate one or more orthogonal components of string position or motion, they are susceptible to harmonic distortion and other undesirable effects. This is one of the main reasons it is important to be able to break up this relative position or motion into components along one or two orthogonal axes and then translate these components into one or two respective output signals.

Once these components are separated, it is also important to provide a linear, or proportional relationship between the relative string position and the output signal.

The prior art does not address the problem of the effects of interference between the two orthogonal components of relative string position or motion. Nor does it sufficiently teach how to construct pickups with definitive linear relationships between the string position and the electrical output signal.

Still other optoelectronic pickup systems are more concerned with providing piecewise information about string motion rather than generating a signal analogous to a more complete description of the trajectory of a vibrating string. This may be acceptable for what they were intended for, which typically is generating only that information about string plucking needed by synthesizers. For instance, U.S. Pat. No. 4,730,530 issued Mar. 15, 1988 to Bonanno discloses a synthesizer guitar controller pickup method for generating control signals for a synthesizer.

Although there is sometimes a narrow linear range of operation for existing optoelectronic pickups for guitar synthesizers, for the majority of typical string positions they are providing only a simple control signal to a synthesizer and so could not be used to replace a standard magnetic pickup for nonsynthesizer type of playing.

Another problem common to all previous optoelectronic pickups is susceptibility to stray light. The typical solution to this so far has been to enclose the pickup system in some sort of light-tight shield. This adds to the cost and complexity of the system however, and since the string must pass through this enclosure on at least one side, there must always be an opening where stray light could enter. Stray light can cause problems in at least two ways. First, it can add to an undesirable DC bias at the detector output which will change for different room light levels. Second, any ambient light with AC components in the audio range e.g. florescent lights, lights with dimmers, infrared remote controls or just lights being turned on or off could be audible at the final output.

Present optoelectronic pickups still at some point have to convert the optical signal to an electronic signal for use by external equipment. The leads that carry this output signal are no more immune to electrical interference than pickups that use nonoptical means. It is desirable to significantly reduce or eliminate this noise.

Also, this type of pickup requires a source of electrical power for the light source. Therefore there may be a need for an efficient way to use this power since it may be desirable to power the pickup with a battery pack instead of running an extra set of power leads off of the guitar.

SUMMARY OF THE INVENTION

Accordingly, several objects and advantages of my invention are:

(a) To provide an output signal that has a direct linear relationship to the time dependent relative position of a string in purely one dimension. This has the advantage of reducing harmonic distortion, and other undesirable effects that arise from mixing more than one component of motion in an arbitrary and possibly nonlinear manner.

(b) To provide, as an option, in addition to that output in (a), an output that has a direct linear relationship to the relative position of the same string along an axis independent or even orthogonal to that described in (a) so that the two resultant output signals can be used by electronic or computer circuitry to reconstruct a mathematical representation or an electronic analog of the relative string position in two dimensions.

(c) To provide one or more ways of reducing or eliminating the effects of ambient light on the output signal.

(d) To provide a means of cancelling noise that may be picked up by lead wires from the detector, and to do so without effecting frequency response.

(e) To provide a means of reducing the light output power required to operate the pickup reliably.

(d) To provide a way to change the gain of the output signal relatively simply by means of a light source therefore eliminating the electronics needed for conventional gain control.

Besides eliminating harmonic distortion there are other advantages to having an output signal that has a direct linear relationship to the relative string position. One prime advantage is the complete information gained about the relative string position in this output signal. Many strategies have been devised for determining certain aspects about the behavior of strings on a guitar while being played, for the purpose of providing this needed information to a synthesizer. Based on this information the synthesizer attempts to determine which note is being played and in what manner it is being played, e.g. plucked hard, or softly strummed. It is important to realize that these strategies really only determine a small subset of information about the behavior of the string.

Now consider the present invention in a configuration where two independent axes of the relative string position are monitored. In this case the output signal contains all information about the two dimensional relative position of the string at all times. Any subsets of information about this time dependent position, like those subsets provided by the pickup systems mentioned above, are fully contained within the output signal of the present invention. Even using just a single dimension of the relative string position information could be useful for this purpose also.

Therefore the present invention can replace any of these systems. This is because it can be used in conjunction with electronic circuitry or computer circuitry that can extract desired subsets of this information or process this information for use by synthesizers or other signal processors.

At this point it should be noted that the speed of the string can be determined from the positional information of the string because this positional information changes with time, that is, it is time dependent.

Further objects and advantages of my invention will become apparent from a consideration of the drawings and ensuing description of it.

BRIEF DESCRIPTION OF THE DRAWINGS

FIG. 1 is a perspective view of a point-like source of light, power source for the light, a circular collimating lens, a string, and a photodetector;

FIG. 2 is a two dimensional top view of the configuration of FIG. 1;

FIG. 3 shows a cylindrical lens and a line-like source of light;

FIG. 4 shows vaious configurations for photodetectors;

DESCRIPTION OF THE INVENTION

Figure 5A:
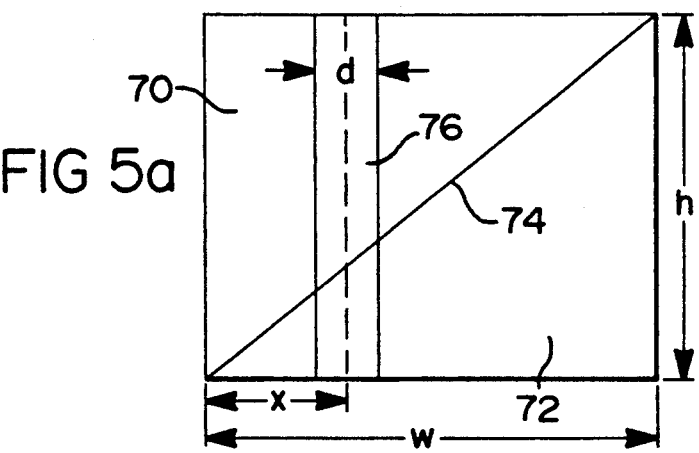
FIG. 5a and 5b are diagrams of photodetector outlines for deriving total illumination versus shadow position relations.

A typical, embodiment of the invention is illustrated in FIG. 1 (perspective view from the side) and FIG. 2 (top view). A string 26, with maximum side to side displacements to positions 40, is having its relative position monitored by the invention. The maximum side to side displacements of string 26 are defined as the largest displacements that would occur during normal operation, or in the case of a stringed instrument, during normal playing of the strings. A lens 24 is placed conveniently close to string 26 but not close enough to come in contact with it when the string vibrates normally, which is about 4 mm away. Optical axis 41 of lens 24 is perpendicular to the longitudinal axis of string 26. A point-like source of light 20, held by a support 23 and powered by an electrical power source 21, is placed at or near the focal point of lens 24 and is substantially small in size relative to lens 24, about 1/20th the diameter. Leads 22 carry electrical power to point-like source 20. Edges 38 of a collimated beam extend beyond maximum displaced string positions 40. A flat detector 28 is placed on the opposite side of string 26 in a position such that a shadow 32 with edges 42 cast by string 26 falls on the detector. This detector is oriented so that the collimated light impinges normal to its surface and is placed conveniently close to string 26 but not close enough to come in contact with it when the string vibrates normally, which is about 4 mm away. A line of electrical isolation 30 forming two electrically independent halves of photodetector 28 should subtend an angle with the longitudinal axis of string 26. This angle should preferably be in the range of 30 degrees to 60 degrees. Leads 34 carry the electrical output signal from the detector to additional electronic circuitry. An optional mask 36 is placed in front of detector 28 and behind string 26, or it is placed between the lens 24 and string 26. Whichever of these two positions is used the invention will function the same. In either case it must be far enough away from string 26 to keep from making contact with the string while it vibrates normally, which is about 4 mm away. Variable transmission filter 37 is not necessary when a triangular outlined detector is used but it is used for a rectangular detector. This filter is configured so that its transmission of the impinging light increases linearly from one end of the filter to the other end along the axis perpendicular to the string axis. It is shown here only to show one of its possible positions in the rectangular detector embodiment.

In FIG. 3 (perspective side view) another embodiment of the invention uses a cylindrical lens 48 and a line-like source of illumination 44, mounted on support 50, in place of circular lens 24 and point-like source 20 of FIG. 1 and FIG. 2. A cylindrical lens 38 is placed so that its longitudinal axis 52 is parallel with the longitudinal axis of string 26. Line-like source 44 is placed at or near the focal line of lens 38 and is substantially thin relative to the width of lens 24, preferably less than 1/20th the width. Leads 46 supply electrical power to source 44.

Note that the top view of the arrangement of FIG. 3 would have the same cross section to that of FIG. 2, where lens 24 now becomes lens 48, and source 20 now becomes source 44.

In FIG. 1, FIG. 2 and FIG. 3 the light sources should be pointed in the direction of the lens and have a uniform beam of light. Also, this beam of light should have a large enough cross section so that after it passes through the lens, it has a large enough cross section to cover beyond the maximum displacement of string 26 from side to side and fully covers the top and bottom edges of the detectors or the mask for the detectors. Lenses 24 or 48 should be transparent to a range of wavelengths of light to which detector 28 is sensitive, and the source of illumination must produce at least some light output in this range of wavelengths.

A silicon photodiode detector can serve as the detector and its typical range of sensitivity in light wavelengths is about 600 to 1200 nanometers. An incandescent lamp, infrared light emitting diode (LED), or infrared laser diode can produce light of these wavelengths and so can be used as the source of illumination.

Silicon photovoltaic cells can also serve as the detector and their typical range of sensitivity is about 400 to 800 nanometers in wavelength and includes the visible spectrum. A red, green, or blue LED can produce light of these wavelengths and so can be used as the source of illumination. Ordinary glass or plastic lenses can transmit these wavelengths and can be used for the collimating lens. Incandescent lamps, visible and infrared LED's, and laser diodes can be obtained readily in packages where the light emerges from a small point-like source. Electroluminescent panels can provide similar sources also. All of the above mentioned light sources can also be lined up on substrates to form a line-like source. The line does not necessarily need to be continuous but can be made up of discrete point-like sources spaced evenly apart and in a line, much as a dot matrix printer forms a line made up of dots. In addition, the end of an illuminated fiber-optic cable can be used to produce either a point-like source or a line-like source.

FIGS. 4a through 4f illustrate various possible shapes of the detector outline and mask. FIG. 4a shows the surface of a single detector 56 along with a mask 54 to form a triangular outline. Dashed lines 57 in each figure represent the positions of the extreme displacements of the string shadow on the detector. A mask is only needed if the outline of the active area of the detector itself is not of a correct triangular shape or if the region of illumination is too small and some portion of it falls within the outline of the active area of the detector. In any event the inner portion of the masked area should be completely illuminated. FIG. 4b is an example of another embodiment of the invention where a detector 50 with a simple rectangular shape (or having a mask with a rectangular shape) is used and a variable transmission filter 59 is placed between the lens and the detector 50. This filter has the property that its optical transmission at a given position on the filter is a linear function of the distance of this position from the filter's edge. In other words, the transmission of the collimated beam increases steadily from one edge 58 of the filter to the other edge 60. FIGS. 4d and 4e depict the same structures as in FIGS. 4a & 4b respectively but using dual detectors instead of a single detector. In this case detectors 45 and 47, which make up one pair, or in the case of the rectangular detectors, detectors 61 and 63 which make up another pair, are placed close enough together so that the shadow from the string covers both detectors of the pair simultaneously. FIG. 4e shows a dual variable transmission filter and detector combination. In each filter section, the direction from edge to edge in which their transmission increases must be opposite the other filter. For instance, say the transmission of filter 65 increases from edge 62 to edge 64. Then the transmission of filter 67 must increase from edge 68 to edge 66. The concerns about the outlines of the active detector areas and the outlines of the regions of illumination are the same as those for the examples in FIGS. 4a and 4b.

Neutral density filters are commonly made from partially silvered or aluminized pieces of glass or plastic. Spatially variable density filters also are manufactured with the partially silvering technique and can be made specifically to provide the variable transmission filter mentioned above.

Figure 6:
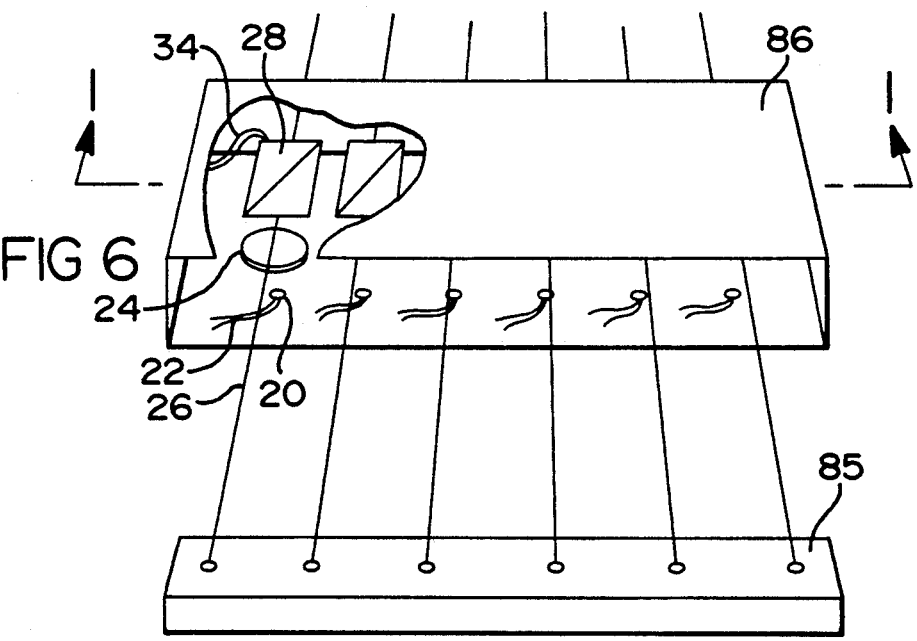
FIG. 6 is a perspective view of a set of guitar strings with a cut away view showing the principal components of the invention placed near the strings.

FIG. 6 is a perspective view of the invention of FIG. 1 as it might be mounted on a six string guitar with bridge 85 of the guitar in the foreground. Here the invention serves as a set of pickups for the guitar. The invention is mounted at each string and in a row going across the strings. A cut away view through an enclosure top 86 reveals the important elements of the string pickup system of FIG. 1 and FIG. 2 including point-like light source 20 with its power leads 22 attached, collimating lens 24, guitar string 26 in its stationary position, and dual detector 28 along with its output signal leads 34, on the opposite side of the string.

Figure 7:
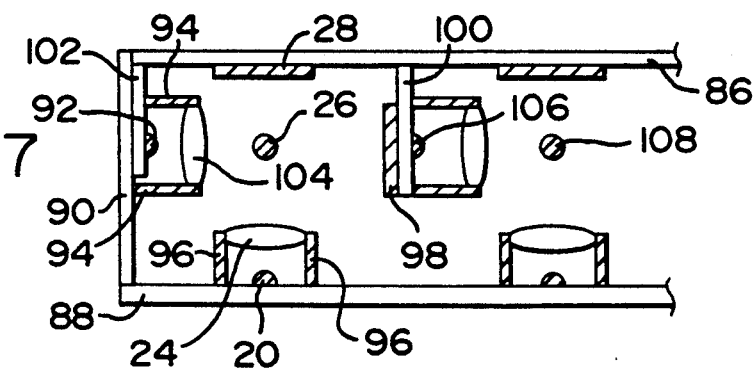
FIG. 7 is a two dimensional cross-sectional view taken along line 1—1 of FIG. 6 and showing an additional pickup at each string.

In FIG. 7 an additional set of pickups are placed at each string and oriented orthogonal to the original set of pickups as can be seen in this partial cross sectional view which is taken along line 1—1 of FIG. 6, but includes the additional orthogonal set. Here the original set of pickups is made up of point-like source 20 attached to an enclosure bottom 88, collimating lens 24 held by a supporting structure 96, string 26, and detector 28 supported by enclosure top 86. The additional orthogonal set is made up of a point-like source 92 attached to a supporting structure 102 and an enclosure side 90, a collimating lens 104 attached to a supporting structure 94, and a detector 98 attached to a supporting structure 100 which also supports a point-like source 106 for the pickup system of an adjacent string 108.

OPERATION OF THE INVENTION

The arrangement of FIG. 1 and FIG. 2 serves to provide a collimated light beam that impinges on string 26 which casts shadow 32 bounded by outlines 42 onto detector 28. The collimated light source is provided by the arrangement of point-like source of illumination 20 and circular lens 24. Because the source of illumination is many times smaller than the diameter of lens 24 and is at or near the focal point of the lens, by passing through the lens, the rays of light become aligned parallel to each other, that is, the light beam becomes collimated. In another embodiment of the invention (FIG. 3), cylindrical lens 48 and line-like source 44 can be used to provide a collimated light beam. We will define the focal line of a cylindrical lens as the locus of points where a collimated beam of light impinging on the cylindrical lens would become most concentrated. Line-like source 44 is placed at or near the focal line of the cylindrical lens. In this arrangement, when looking at a cross section to which axis 52 is normal, the rays of light passing out of the lens are parallel. The rays of light are not parallel with respect to other cross sections, however this does not effect shadow contrast of string 20 and so does not effect the operation of the invention. Also, it should be noted that while opaque strings will cast solid shadows under collimated impinging light, even clear nylon strings will cast reasonably solid shadows due to their index of refraction being different from air.

We will define the region of active area to be that region which is the photosensitive region of the detector that is also illuminated. We will also define the border of active area to be that line between the active area and all other areas. Therefore the border of active area could be that line separating an illuminated portion of the photosensitive region of the detector and a mask or the shadow from a mask. It could also be the line separating the illuminated portion of the photosensitive region and the edge of the detector surface.

The fact that the light beam is collimated is important because it causes a shadow with sharp outlines to be cast irrespective of the position of the string within the collimated beam. This applies to the string position along the axis of propagation of the light beam. Looking at FIG. 2, if the string were to move only along the axis of propagation of the impinging light, there would be no change in the shadow pattern on the detector surface because the rays of light are parallel. This principal is used by the invention in order to detect the position of a string along only a single axis at a time. Any motion along the orthogonal axis has no effect on the shadow pattern and shadow position and hence the output signal.

FIG. 5a is a diagram of the string shadow pattern 76 on the surface of a split detector. Diagonal line 74 represents a line of electrical isolation between independent detector halves 70 and 72. The height of the detector is labeled h, the width w, and the width d of a string shadow 76. The following discussion will assume that the relative string position is the same as the shadow position x, and so the two terms will be used interchangeably when referring to x. The output of each detector half is directly proportional to the total illumination of that half. For uniform illumination, the output signal is proportional to the total active area of the detector half. It should be readily apparent from FIG. 5a that as this shadow changes position along the width of the detector pair, the length of the shadow portion contained in each detector half changes respectively. Now, since the area of the shadow in each detector half is proportional to the length of the shadow, the total illumination and therefore the signal output of each detector half varies as the shadow changes position along the detector. This relation is qualified with the equations that follow derived from the configuration of FIG. 5a. For detector half 70; $i = K_f Ih(w/2 + xd/w - d)$, and for complimentary detector half 72; $i = K_f Ih(w/2 - xd/w)$, where $K_f$ is a constant of proportionality dependent on the detector, and I is the intensity or power per unit of area of the impinging illumination. These equations express the output current i passed through the detector (assuming it is properly biased) as a function of w, h, d, the intensity I, and relative string position x. This demonstrates that the output signals of detector halves 70 & 72 are proportional to the relative string position which is an objective of the invention. It also demonstrates that for the triangular outlined split detector of FIG. 1 and FIG. 4d, the rate of change of the output of one detector half with respect to the shadow position x is minus the rate of change of the other detector output with respect to the same shadow position x.

Figure 5B:
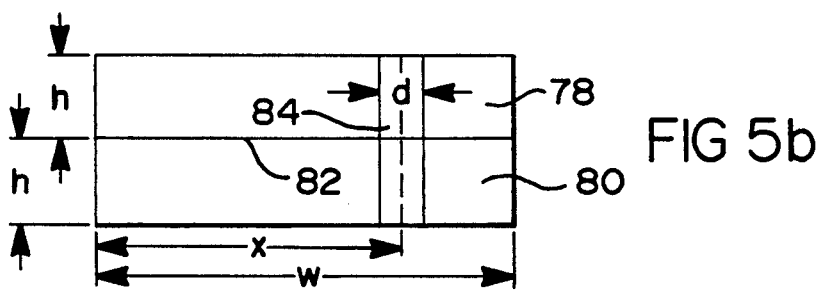

FIG. 5b is a diagram of the string shadow pattern in another embodiment of the invention. In this example it is assumed for clarity that a rectangular filter is placed directly over a rectangular detector forming a filter/detector combination. However, the filter could actually be separated from the detector and placed anywhere in the collimated beam of illumination so long as it does not interfere with the motion of string 26. A pair of rectangular filter/detector combinations is represented by rectangles 78 and 80. The filter portion of each of these combinations is a spatially variable transmission filter which covers the rectangular detector. A line 82 represents the border of electrical isolation between the two independent detector halves. A string shadow pattern 84 remains the same as it was for the triangular outlined detector, but in this case the intensity of the light impinging on the detector surface is not constant along the surface because of the action of the filter. As the shadow of the string changes position along the edge of the detector, it moves to areas of varying intensity. This means that the amount of light that the shadow eclipses also changes and therefore the total illumination of the detector changes as the shadow changes position along the detector even though the shadow does not change in size or shape. This relation can be expressed with equations derived from the configuration of FIG. 5b. Here we assume that the intensity or power per unit area of the impinging illumination I after passing through a filter is dependent on the shadow position x from the edge of the detector. For now we can choose this relation for detector/filter combination half 78 to be $I = I_m(1-x/w)$, where $I_m$ is the maximum intensity transmitted by the filter to the left edge of the detector, that is, where $x=0$. For detector/filter combination half 80 it will be $I = I_m x/w$. For detector/filter combination 78 then, $i = K_r I_m h(w/2 + xd/w - d)$, and for detector/filter 80, $i = K_r I_m h(w/2 - xd/w)$, where $K_r$ is a constant of proportionality dependent on the detector. These equations express the output current i as a function of w, h, d, $I_m$ and relative string position x. They demonstrate that the output signal of this detector is proportional to the relative string position x which again is an objective of the invention. Likewise, any collimated source of light varying in intensity linearly from one extreme of the shadow displacement to the other will give the same result. As an example, the variable transmission filter could be replaced by a variably reflective mirror with the collimated beam being reflected by the mirror to direct it towards the detector. This mirror can be, for instance, a partially silvered variable neutral density filter used in a reflection mode rather than a transmission mode.

It is important that when constructing the detector, including its mounts and masks, that care should be taken to insure that the linear relationship between total illumination and the relative string position, and hence shadow position is maintained. This means, for instance, that if a triangular outlined detector is used, that other active area borders of the detector are straight edged so that they do not introduce nonlinearities in this relationship and also that they do not have angles themselves that might serve to attenuate or cancel the intended linear relationship. FIG. 4c and 4f are examples which show possible active area contours that can still give this linear relationship.

Figure 10A:
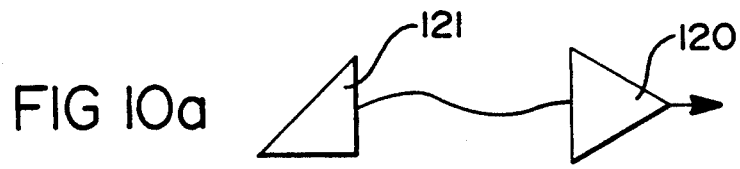
FIGS. 10a, 10b, and 10c show several techniques for processing the photodetector output signal with differential, summing and dividing amplifiers.
Figure 10B:
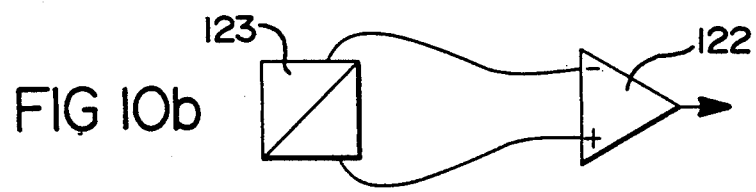
Figure 10C:
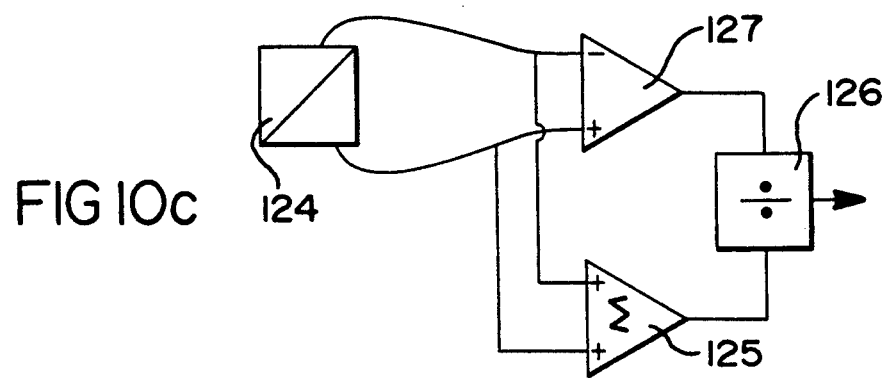

FIGS. 10a, 10b, and 10c show three different ways to convert the detectors output signals into useful forms. In FIG. 10a, the output of a single half of a split detector 121 is fed to a simple amplifier 120. If the detector is a photovoltaic device or a photodiode, then the desired output is the short circuit or reverse biased current of the detector and the amplifier should be configured as a current to voltage converter which is well known in the art. If amplifier 120 has a gain $G_1$ then the equation for output $V_1$ of this amplifier is $V_1 = G1 K_r I h(w/2 + xd/w - d)$. Notice that the gain of the output can be adjusted not by just $G_1$ but also by the intensity I. This means that the gain of the output can be adjusted simply by adjusting the intensity of the source of impinging illumination. If the intensity of the light source is doubled, then the gain will also be doubled. This light controlled gain adjusting feature, in this particular embodiment, is another objective of the invention.

In FIG. 10b, a split detector 123 is used and the output of one detector half goes to the noninverting input of a differential amplifier 122 which has a gain of $G_2$ and the output of the remaining detector half goes to the inverting input of the same differential amplifier. In this configuration the output of the differential amplifier gives a signal proportional to the difference in the total illumination of each detector half. This subtracts away the large DC signal that is present due to the large illuminated area compared with the small shadowed area. This makes the design of the electronics used to process this output signal simpler. The output equation for this configuration is $V_2 = G_2 K_r I h(d - 2xd/w)$. By inspecting this output equation it ca be seen that the output is zero when the shadow is centered on the detector, that is, when $x=w/2$ in FIG. 5a and FIG. 5b. This demonstrates that any DC bias at the output of the detectors can be removed with this differential amplifier configuration.

Also, by running the leads from the two detector halves near to or next to each other, the common mode noise signals that are picked up by these leads will get cancelled out by the differential amplifier. This is analogous to the humbucking configuration of magnetic pickups but without the loss of high frequencies or any other audio frequencies.

In FIG. 10c, in addition to the signals from each half of a detector 124 going to a differencing amp 127 with a gain of $G_2$, the signals from each half of detector 124 are also summed together by a summing amplifier 125 with a gain of $G_3$, and then, by means of a divider 126 with a gain of $G_4$, the differenced signal outputs are divided electronically by the summed signal output. The equation for output $V_3$ for this configuration is $V_3 = (G_4 G_2/G_3)(d - 2xd/W)/(w - d)$. This configuration has the common mode noise cancelling and DC signal cancelling advantages of the configuration of FIG. 10b along with one additional advantage. This additional advantage is that the signal is independent of the intensity of impinging light on the detector as can be seen by inspection of the output equation where there is no term for I, the intensity. This means that the output signal is now totally immune to stray light, which is another objective of the invention. It is also immune to varying light levels of the source of illumination.

FIG. 10a through 10c assumed the use of the triangular outlined split detector, but the rectangular variable transmission filter and the rectangular detector combination would perform similarly with the same benefits arising from the signal amplifying, differencing, summing and dividing techniques discussed above. The same is true for any collimated light source varying linearly in intensity from one extreme shadow position to the other such as the variably reflective mirror technique mentioned above. For the variable transmission filter technique one would need only replace the triangular outlined detectors of FIG. 10a through 10c with the rectangular filter and detector combination and the amplifiers in FIG. 10a through 10c would provide similar linear outputs to those described above.

Finally, it should be noted in this discussion about detectors and detector illumination that the important point here is to get a total integrated illumination on the detector that will vary linearly with relative shadow position on the detector.

Figure 9:
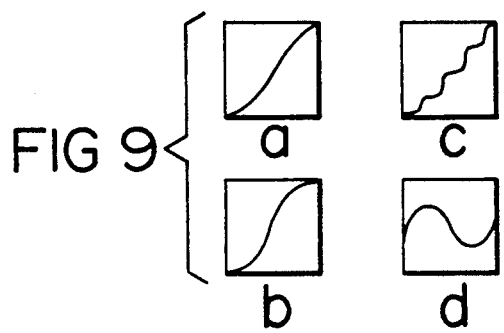
FIG. 9 shows various alternative active area outlines for the dual detector.

Until now the linearity of the output signal with the relative string position along one axis has been stressed because of the importance of desired fidelity of the pickup system, i.e. lack of harmonic distortion. This is almost always true, yet there are some instances when something other than a linear relationship could be useful. For example, suppose you wanted some amount of compression of the output signal to limit its dynamic range. Instead of implementing this electronically as is usually done, it is possible to modify the invention to provide this feature automatically. For example, in FIG. 9a, at the extreme ends of a split detector the active area outlines are tapered toward the horizontal. This slows the rate of the output signal near this extreme string position affording the desired signal compression. In a more pronounced configuration like that in FIG. 9b, a distortion effect can be obtained from the soft clipping of the signal caused by the severe tapering of the detector active area outlines. By having this distortion producing pickup at each string of a guitar, the signals from each string are distorted individually first, and then added together. This is generally preferred to the prevalent method of combining the undistorted signals from each string pickup first, and then distorting the summed result. Still other effects are possible simply by contouring the active area outline as desired, FIG. 9c and FIG. 9d as an example. Likewise, with the variable transmission and variably reflective technique, the filter used can be tapered in its transmission or reflection respectively to give the same output response as the detectors in FIG. 9a through 9d.

In the preferred embodiment, a point-like LED source of illumination placed at or near the focal distance of the lens, directs its light toward to the lens. With this geometry, the lens will serve to bend the rays of light so that they are parallel to each other, in other words, collimated. Generally, the smaller the dimension of the light source the better will be the collimation of the light. In addition to LEDs, any light source that produces wavelengths of light to which the detector is sensitive, and is of a small dimension in comparison to the collimating lens will be collimated by this technique and serve the purpose of the invention. This includes laser diodes, incandescent bulbs, and electroluminescent displays.

If any of these above mentioned light sources feed their light into a fiber-optic cable, their light will emerge from the opposite end of the cable as though the end of the cable was a small point-like source, assuming the cable end is small and point-like. This also helps to make the light more uniform. Fiber-optic cables are typically available in the form of fibers that are much smaller in dimension than the collimating lens. When this fiber end is placed at or near the focal distance of the lens and directing its illumination towards the lens, the lens can collimate the fiber end's rays just as from any other point-like source. Methods of feeding the illumination into the fiber are well know in the art. In a multiple stringed instrument with several optical pickups, all the fibers or fiber bundles going to each pickup could be fed by a single light source. These fibers could also be run off of the instrument and to a separate light source, eliminating the need for a light source mounted on the guitar or in the pickups. Running this thin cable together with the output signal cable would make it unnoticeable, especially if the light source and output signal processor were placed together in the same piece of equipment. This would reduce the size and weight of the pickups.

Figure 8:
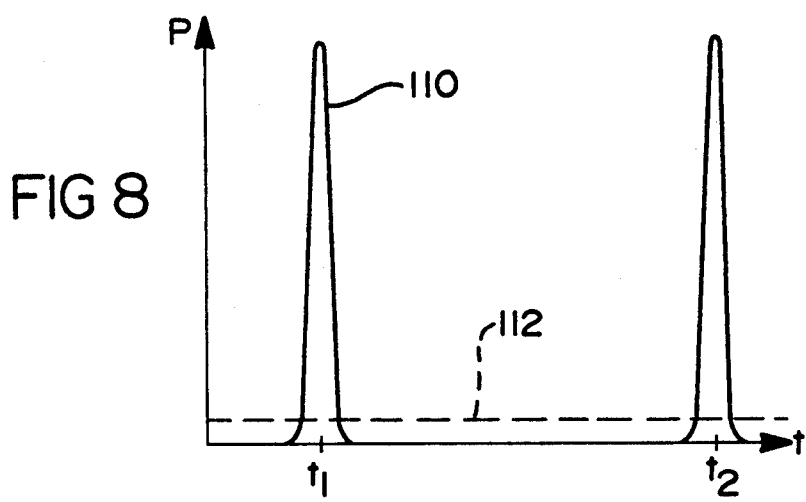
FIG. 8 is graph of light output power versus time depicting two pulses of light from a pulsating illumination source.

The discussion so far has assumed the use of a constant power source for the source of illumination in the invention. However, it is also possible to pulse the source of illumination in order to obtain even more immunity to stray light or to reduce the power requirements of the invention. Methods for pulsing light sources at regular intervals are well known in the art, the LM3909 by National Semiconductor is an example. In FIG. 1, power source 21 would simply be replaced with a pulsing power source. FIG. 8 is a graph of two such pulses of light with power P represented on the vertical axis and time t on the horizontal axis. At time $t_1$ a pulse 110 occurs followed at a later time $t_2$ by another pulse. Dotted line 112 represents the time averaged power level of a continuous train of pulses. By crowding the light energy into a narrow time spanned pulse, a momentary peak can occur with a power level many times higher than that of the stray light. Therefore, with a given time averaged operating power level of the light source, a momentarily much higher signal to noise ratio can be obtained by pulsing that light source. For the same optical signal to noise ratio as a continuous source would provide, the pulse power level needs to go only as high as the power level of the continuous source. But because the pulsing light source is actually off most of the time(between pulses), the average power requirement is many times reduced. So by pulsing the light source, either an increase in the optical signal to noise ratio of many times can be achieved, or a decrease in the average power requirement of many times can be achieved, or some compromise between the two can be achieved.

In order to avoid a pulsing output, the output needs to be either sampled and held, or smoothed out with a low pass analog filter. Both of these techniques are well known in the art. Analog Devices, Inc. is one manufacturer of monolithic sample and hold circuits such as the AD582. Low pass filter designs are compiled in many handbooks, and easy to use monolithic filter circuits are available like the LTC1059 from Linear Technology Corporation. Modern guitar signal processors include sample and hold circuitry as well as analog to digital convertors that digitize the sampled output waveform of the pickup. Since pulsing circuits routinely provide triggering outputs to synchronize with the pulses, it is straightforward to connect this trigger to a sample and hold circuit in order to synchronize the two together.

While my invention has been described in terms of a few specific examples and configurations, it will be appreciated that other forms could readily be adapted by one skilled in the art. Accordingly, the scope of my invention is to be considered limited only by the following claims.

I claim:

1. An optoelectronic pickup for detecting the displaced position of a string having a longitudinal axis relative to a fixed point and translating the relative position of the string into an electrical output signal, comprising:
    (a) a means for producing collimated illumination, said illumination radiating along an axis and impinging on the surface of the string and nearby surrounding adjacent areas to the string; and
    (b) a detector for detecting the collimated illumination which passes around said string, and also for detecting the resultant shadow cast by said string, said detector including a photodetector having an active area which is substantially perpendicular to the axis of the collimated illumination, said photodetector being responsive to illumination and shadows and also being capable of translating the relative portions of each of the illuminated area and shadow area into an electrical signal, whereby the total illumination of the active area of said detector has a direct linear relationship to the relative position of said string over the maximum displacement range of said string during normal operation and having an electrical output signal proportional to illuminated area of said photodetector.

2. An optoelectronic pickup for detecting the displaced position of a string having a longitudinal axis relative to a fixed point and translating the relative position of the string into an electrical output signal, comprising:

(a) a means for producing collimated illumination, said illumination radiating along an axis and impinging on the surface of the string and nearby surrounding adjacent areas to the string; and (b) a detector for detecting the collimated illumination which passes around said string, and also for detecting the resultant shadow cast by said string, said detector including a photodetector having a photoresponsive active area which is substantially perpendicular to the axis of the collimated illumination, said photodetector being responsive to illumination and shadows and also being capable of translating the relative portions of each of the illuminated area and shadow area into an electrical signal, and said photoresponsive active area of said photodetector having borders which subtend an angle with the axis of said string, whereby the total illumination of the active area of said detector has a direct linear relationship to the relative position of said string over the maximum displacement range of said string during normal operation and having an electrical output signal proportional to illuminated area of said photodetector.

3. The optoelectronic pickup of claim 2, wherein the detector includes a photoresponsive cell whose active area borders include a plurality of triangular-shaped outlines and is made of a device that is selected from the group consisting of photovoltaic cells and photodiodes.

4. The pickup of claim 2, wherein said means for producing collimated illumination includes (a) a point-like source of light; and (b) a lens having a focal length, said lens being placed a distance approximately equal to its focal length from said point-like source of light and said point-like source of light being oriented so as to pass a portion of its light through said lens.

5. The pickup of claim 4, wherein said point-like source of light is produced by a light emitting device selected from the group consisting of light emitting diodes, laser diodes, electroluminescent elements, and illuminated optical fibers.

6. The optoelectronic pickup of claim 2, wherein said means for producing collimated illumination includes (a) a line-like source of light; and (b) a cylindrical lens having a focal length, said lens being placed a distance approximately equal to its focal length from said line-like source of light and said line-like source of light being oriented so as to pass a portion of its light through said lens.

7. The optoelectronic pickup of claim 6, wherein said line-like source of light is produced from a light emitting device selected from the group consisting of light emitting diodes, laser diodes, electroluminescent elements, and the ends of optical fibers.

8. The optoelectronic pickup of claim 2 wherein the means for producing collimated illumination includes a pulsing means whereby power to said means for producing illumination is momentarily increased to a predetermined level and then reduced to a substantially lower level until another pulse occurs, said pulses occurring repeatedly.

9. The optoelectronic pickup of claim 2, further comprising a variable gain means including an intensity adjusting means for said impinging light which results in variable gain of said output signal.

10. An optoelectronic pickup for detecting the displaced position of a string having a longitudinal axis relative to a fixed point and translating the relative position of the string into an electrical output signal, comprising:

(a) a light source for impinging light on said string;

(b) a dual detector means including two electrically independent photoresponsive active areas for detecting the illumination which passes around said string, and also for detecting the resultant shadow cast by said string, said photoresponsive area being responsive to illumination and shadow and also being capable of translating the relative portions of each of the illuminated area and shadow area into an electrical signal, and said photoresponsive active areas of said detector having borders which subtend an angle with the axis of said string, whereby the total illumination of the active area of each portion of said dual detector means has a direct linear relationship to the relative position of said string over the maximum displacement range of said string during normal operation and having an electrical output signal for each independent photoresponsive active area, said signals are proportional to the total illuminated area of said each independent photoresponsive active area, and rate of change of total illumination with respect to the relative string position of said one electrically independent photoresponsive active area is minus that of said rate for said remaining electrically independent photoresponsive active area and the output signal of said each portion of dual detector means goes to the inputs of an electronic differencing means whereby an output is provided which represents the difference between said inputs.

11. The optoelectronic pickup of claim 10, further comprising a summing means whereby an output is provided which represents the summation of said inputs, and also including a dividing means whereby an output is provided which represents said output of differencing means divided by said output of summing means.

12. The optoelectronic pickup of claim 10 wherein the means for producing collimated illumination includes a pulsing means whereby power to said means for producing illumination is momentarily increased to a predetermined level and then reduced to a substantially lower level until another pulse occurs, said pulses occurring repeatedly.

13. The pickup of claim 10, wherein the detector includes a photoresponsive cell whose active area borders include a plurality of triangular-shaped outlines and is made of a device that is selected from the group consisting of photovoltaic cells and photodiodes.

14. The pickup of claim 10, further including a variable gain means whereby an intensity adjusting means of said impinging light results in variable gain of said output signal of differencing means.

15. The optoelectronic pickup of claim 10 wherein the light source for impinging light on said string includes a means for producing collimated illumination, said illumination radiating along an axis and impinging on the surface of the string and nearby surrounding adjacent areas to the string.

16. The pickup of claim 15 wherein said means for producing collimated illumination includes
   (a) a point-like source of light; and
   (b) a lens having a focal length, said lens being placed a distance approximately equal to its focal length from said point-like source of light and said point-like source of light being oriented so as to pass a portion of its light through said lens.

17. The pickup of claim 16 wherein said point-like source of light is produced by a light emitting device selected from the group consisting of light emitting diodes, laser diodes, electroluminescent elements, and illuminated optical fibers.

18. The optoelectronic pickup of claim 15 wherein said means for producing collimated illumination includes
   (a) a line-like source of light; and
   (b) a cylindrical lens having a focal length, said lens being placed a distance approximately equal to its focal length from said line-like source of light and said line-like source of light being oriented so as to pass a portion of its light through said lens.

19. The optoelectronic pickup of claim 18 wherein said line-like source of light is produced from a light emitting device selected from the group consisting of light emitting diodes, laser diodes, electroluminescent elements, and the ends of optical fibers.

20. An optoelectronic pickup for detecting the displaced position of a string having a longitudinal axis relative to a fixed point and translating the relative position of the string into an electrical output signal, comprising:
   (a) a light source for impinging light on said string;
   (b) a detector for detecting the impinging light which passes around said string, and also for detecting the resultant shadow cast by said string, said detector including a photodetector having an active area which is substantially perpendicular to the axis of the collimated illumination, said photodetector being responsive to illumination and shadows and also being capable of translating the relative portions of each of the illuminated area and shadow area into an electrical output signal.
   (c) a filter placed between the light source and the photodetector within said illumination, but not interfering with the motion of said string, and intercepting the illumination passed around said string and the resultant shadow cast by said string before reaching said detector, and said filter having a transmission which varies linearly along an axis which is perpendicular to said longitudinal axis of the string, whereby the total integrated illumination of the active area of said detector has a direct linear relationship to the relative position of said string over the maximum displacement range of said string during normal operation, and said detector having an electrical output signal proportional to the total integrated illumination of said photodetector.

21. The optoelectronic pickup of claim 20 wherein the means for producing illumination includes a pulsing means whereby power to said means for producing illumination is momentarily increased to a predetermined level and then reduced to a substantially lower level until another pulse occurs, said pulses occurring repeatedly.

22. The optoelectronic pickup of claim 20, further comprising a variable gain means including an intensity adjusting means for said impinging light which results in variable gain of said output signal.

23. An optoelectronic pickup for detecting the displaced position of a string having a longitudinal axis relative to a fixed point and translating the relative position of the string into an electrical output signal, comprising:
   (a) a light source for impinging light on said string;
   (b) a dual detector means including two electrically independent photoresponsive active areas for detecting the illumination which passes around said string, and also for detecting the resultant shadow cast by said string, said photoresponsive area being responsive to illumination and shadow and also being capable of translating the relative portions of each of the illuminated area and shadow area into an electrical signal, said signals are proportional to the total illuminated area of each of said independent photoresponsive active areas, and the output signal of each of said portion of dual detector means goes to the inputs of an electronic differencing means whereby an output is provided which represents the difference between said inputs;
   (c) a dual filter means placed between the light source and the dual detector means within said illumination, but not interfering with the motion of said string, and intercepting the illumination passed by said string and the resultant shadow cast by said string before reaching said dual detector means, and said dual filter means having two transmitting portions, one of said filter portions intercepting the illumination that impinges on one of said electrically independent photoresponsive active areas, and said filter portion having a transmission that increases linearly in one direction along an axis which is substantially perpendicular to said longitudinal axis of the string, the remaining of said portion of filter means intercepting the illumination of the remaining said electrically independent photoresponsive active area, and having a transmission that decreases linearly in said direction along said axis, whereby the total integrated illumination of the active area of each portion of said dual detector means has a direct linear relationship to the relative position of said string over the maximum displacement range of said string during normal operation and having an electrical output signal for each independent photoresponsive active area, and the rate of change of the total integrated illumination with respect to the relative string position of said one electrically independent photoresponsive active area is minus that of said rate for the remaining said electrically independent photoresponsive active area and the output signal of said each portion of dual detector means goes to the inputs of an electronic differencing means whereby an output is provided which represents the difference between said inputs.

24. The optoelectronic pickup of claim 23 wherein the means for producing illumination includes a pulsing means whereby power to said means for producing illumination is momentarily increased to a predetermined level and then reduced to a substantially lower level until another pulse occurs, said pulses occurring repeatedly.

25. The optoelectronic pickup of claim 23, further comprising a variable gain means including an intensity adjusting means for said impinging light which results in variable gain of said output signal.

26. The optoelectronic pickup of claim 23, further comprising a summing means whereby an output is provided which represents the summation of said inputs, and also including a dividing means whereby an output is provided which represents said output of differencing means divided by said output of summing means.

27. The optoelectronic pickup of claim 2, wherein the detector includes a photoresponsive cell made of a device selected from the group consisting of photovoltaic cells and photodiodes.

28. The optoelectronic pickup of claim 10, wherein the detector includes a photoresponsive cell made of a device selected from the group consisting of photovoltaic cells and photodiodes.

* * * * *